(12) United States Patent
Sokhin et al.

(10) Patent No.: US 11,748,238 B2
(45) Date of Patent: Sep. 5, 2023

(54) MODEL-BASED BIASED RANDOM SYSTEM TEST THROUGH REST API

(71) Applicant: International Business Machines Corporation, Armonk, NY (US)

(72) Inventors: Vitali Sokhin, Haifa (IL); Dean Gilbert Bair, Bloomington, NY (US); Gil Eliezer Shurek, Haifa (IL); Shiri Moran, Kiryat Tivon (IL); Tom Kolan, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 17/333,640

(22) Filed: May 28, 2021

(65) Prior Publication Data
US 2022/0382665 A1 Dec. 1, 2022

(51) Int. Cl.
*G06F 11/00* (2006.01)
*G06F 11/36* (2006.01)
*H04L 67/133* (2022.01)

(52) U.S. Cl.
CPC ...... *G06F 11/3684* (2013.01); *G06F 11/3688* (2013.01); *H04L 67/133* (2022.05)

(58) Field of Classification Search
CPC . G06F 11/3684; G06F 11/3688; H04L 67/133
See application file for complete search history.

(56) References Cited

U.S. PATENT DOCUMENTS

| 7,549,144 | B2 |   | 6/2009  | Jubran    |              |
|-----------|----|---|---------|-----------|--------------|
| 10,013,340| B1 | * | 7/2018  | Quadras   | G06F 11/3688 |
| 10,042,728| B1 | * | 8/2018  | Kuzmin    | G06F 11/3688 |
| 10,437,712| B1 |   | 10/2019 | Tyler     |              |
| 11,507,496| B2 | * | 11/2022 | Edwards   | G06F 11/3684 |
| 2011/0145653 | A1 | * | 6/2011 | Broadfoot | G06F 11/3604 |
|           |    |   |         |           | 714/E11.217  |
| 2020/0133744 | A1 |   | 4/2020 | Macleod   |              |
| 2020/0210258 | A1 |   | 7/2020 | Cramer    |              |
| 2020/0364127 | A1 |   | 11/2020| White     |              |
| 2021/0011837 | A1 | * | 1/2021 | Coppa     | G06F 11/3684 |

FOREIGN PATENT DOCUMENTS

CN 113489672 A 10/2021

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

(Continued)

*Primary Examiner* — Joshua P Lottich
(74) *Attorney, Agent, or Firm* — Richard B. Thomas

(57) ABSTRACT

Embodiments relate to a system, program product, and method for validating a system under test (SUT). The method includes selecting one or more random biases for one or more properties of the one or more API requests. The method also includes transmitting the one or more API requests to the SUT, transmitting an API response from the SUT for each of the one or more API requests, and validating each API response.

20 Claims, 6 Drawing Sheets

(56) References Cited

OTHER PUBLICATIONS

Viglianisi et al., "RESTTESTGEN: Automated Black-Box Testing of RESTful APIs," 2020 IEEE 13th International Conference on Software Testing, Validation and Verification (ICST), Oct. 24-28, 2020, 11 pages.
A. Arcuri, "RESTful API Automated Test Case Generation," 2017 IEEE International Conference on Software Quality, Reliability and Security (QRS), 2017, pp. 9-20, doi: 10.1109/QRS.2017.11.
Zhang, M., Marculescu, B. & Arcuri, A. Resource and dependency based test case generation for RESTful Web services. Empir Software Eng 26, 76 (2021). https://doi.org/10.1007/s10664-020-09937-1.
List of IBM Patents or Patent Applications Treated as Related, signed Jun. 14, 2022, 2 pages.

* cited by examiner

MODEL-BASED BIASED RANDOM SYSTEM TEST THROUGH REST API

BACKGROUND

The present disclosure relates to validating systems through multiple computing environments, and, more specifically, to testing the respective systems through a model-based, biased, and random test regime via the respective representational state transfer (REST) application programming interfaces (APIs).

Many known modern computing systems and applications communicate through programmatic interfaces such as REST APIs. Therefore, testing of an associated system (i.e., system under test, or SUT) includes testing of the REST APIs. At least some known traditional methods of testing the REST APIs include manually written tests, fuzz testing, algorithmic test generation, random test generation, and metamorphic testing.

SUMMARY

A system, computer program product, and method are provided for testing of SUTs through REST APIs.

In one aspect, a computer system is provided for to validate a system under test (SUT). The system includes one or more processing devices. The system also includes one or more memory devices communicatively coupled to the processing device. The system further includes a test generation module and a test responses validation module communicatively and operably coupled to the one or more processing devices. The one or more processing devices configured to generate, through the test generation module, one or more application programming interface (API) requests. The one or more processing devices are also configured to select, through the test generation module, one or more random biases for one or more properties of the one or more API requests. The one or more processing devices are further configured to transmit, through the test generation module, the one or more API requests to the SUT. The one or more processing devices are also configured to receive, from the SUT, an API response for each of the one or more API requests. The one or more processing devices are further configured to validate, through the test responses validation module, each API response.

In another aspect, a computer program product embodied on at least one computer readable storage medium having computer executable instructions for validating a system under test (SUT) that when executed cause one or more computing devices to generate one or more application programming interface (API) requests including select one or more random biases for one or more properties of the one or more API requests, transmit the one or more API requests to the SUT, receive an API response from the SUT for each of the one or more API requests, and validate each API response.

In yet another aspect, a computer-implemented method is provided for validating a system under test (SUT). The method includes generating one or more application programming interface (API) requests. The method further includes selecting one or more random biases for one or more properties of the one or more API requests. The method also includes transmitting the one or more API requests to the SUT. The method further includes receiving an API response from the SUT for each of the one or more API requests. The method also includes validating each API response.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
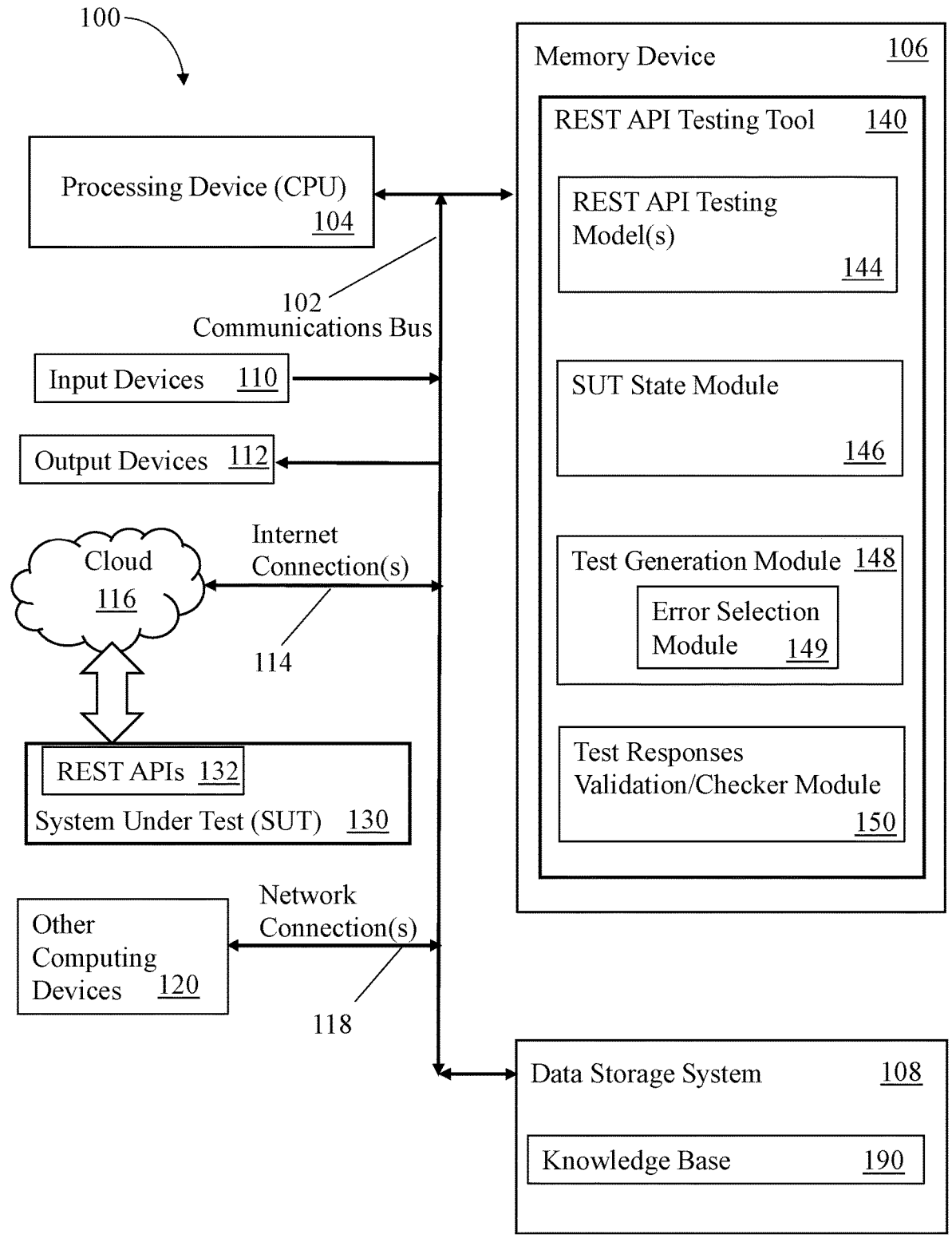
FIG. 1 is a block schematic diagram illustrating a computer system configured for testing of SUTs through REST APIs, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to validating systems under test (SUTs) through a model-based, biased, and random test regime via the respective representational state transfer (REST) application programming interfaces (APIs). While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known applications and systems, including those applications and systems that are cloud-based, a data center, and stand-alone servers, use application programming interfaces (APIs) to facilitate communications between a client or user. Many of these communications are transmitted by and an application or system through a cloud-based infrastructure. In general, an API is an interface that defines interactions between multiple software applications or mixed hardware-software intermediaries through a set of definitions, standards, and protocols for building and integrating application software to facilitate internal communications within the internal infrastructure of internal computing systems as well as the aforementioned cloud-based communications. However, the APIs are not themselves the definitions, standards, and protocols. In at least some embodiments, an API is a mechanism that enables an application or service to access a resource within another application or service. The application or service doing the accessing is called the client, and the application or service containing the resource is called the server.

For example, and without limitation, an API may be used to define the types of calls (i.e., Hypertext Transfer Protocol (HTTP) requests) that can be made, how to make them, the data formats that should be used, the conventions to follow, etc. In addition, the API facilitates transmission of a response to the call from the application/system. Therefore, in at least some aspects, an API may act as a mediator between the users or clients of a particular application or system and the resources or web services for which they desire access. For such users and clients, the APIs are substantially transparent and provide a method for an organization to share resources and information while maintaining security, control, and authentication through determining who gets access to what. In general, the APIs are resident within a portion of the respective application or system to most effectively provide the specific functionality to the users/clients.

Many known modern internal and cloud-based computing systems and applications use REST APIs. REST is an acronym for representational state transfer, where, for example, and without limitation, a client may request a resource using a REST API and the server transfers back the current state of the resource in a standardized representation. In general, a resource in the present context is any piece of information that the API can provide the client. For instance, a resource in a social media application's API could be a user, a page, a photo, or a post. The REST API is configured to execute one or more of creation, addition, and deletion of different resources as well as resources that already exist. Therefore, REST APIs may be configured to receive requests for a resource and generate a response that returns relevant information about the requested resource, i.e., the state of the resource, where the response is translated into a format that clients can easily interpret as determined by the API receiving the requests. Clients can also modify items on the server and even add new items to the server through a REST API.

Testing of an associated system (i.e., system under test, or SUT) includes validation testing of the associated REST APIs. More specifically, the SUT is tested through the REST API layer where some logic such as that associated with validation of request parameters resident within the REST API layer is also tested. At least some known traditional methods of testing the REST APIs include manually written tests, fuzz testing, algorithmic test generation, random test generation, and metamorphic testing. However, in general, such testing mechanisms tend to be biased toward valid requests that will produce expected results, and are typically not configured to traverse the spectrum of erroneous, i.e., invalid requests. The valid requests are configured to validate the required functional of the SUT. The invalid requests are inserted to occasionally validate the performance of the SUT in rejecting such requests and transmitting an error notification to the user rather than testing any other functionality of the SUT. As used herein, the term "path" refers to an operational path through the SUT, including the various paths through the APIs, application(s), and associated hardware. In some circumstances, the user may elect to test only a portion of the respective SUT, e.g., and without limitation, one or more applications out of a suite of applications, and particular portions of the associated hardware. The valid requests use those paths through the SUT for which the respective testing scenarios are configured to test known features that will likely return satisfactory results with little to no identified deficiencies. Therefore, the respective testing is configured to expose otherwise hidden deficiencies and/or unexpected behaviors. However, many of the known testing mechanisms cannot generate the desired range of tests to locate the unknown deficiencies through the SUT.

Manually written tests may be configured to validate elaborated use cases; however, they are typically drafted for targeting a specific SUT, provide a relatively low level of coverage due to only targeting problems anticipated by the authors of the tests, are labor-intensive, and require frequent maintenance.

Fuzz testing is an automated software testing technique that involves changing valid tests to provide invalid, unexpected, or random data as inputs to a SUT. The SUT is then monitored for respective responses, i.e., checking of the responses is performed. However, fuzz testing does not facilitate providing test conditions that press against the boundaries of the SUT's features, especially if there are various dependencies between different API calls. In addition, the testing is very limited, usually only targeting server error responses. Moreover, fuzz testing does not use state information of the SUT.

Algorithmic test generation uses some type of algorithm (e.g., an evolutionary algorithm that mimics the behaviors of living things) to generate random tests, which will create tests that meet predetermined criteria, with meaningful interactions; however, satisfactory distance functions (i.e., functions that provide a distance between elements of a set where the difference between the respective elements is proportional to the distance) are required to guide the search. Also, as with fuzz testing, without a state of the system, the tests results are unpredictable, and therefore the checking is limited.

Random test generation randomizes valid API request generation, according to the relevant technical specification, for example, OpenAPI schema, transmits the requests, and validates the syntax of the response; however, this method is limited in the coverage space it can reach and the subsequent checking (as in previous methods). Random test generation does not use a state of the SUT.

Metamorphic testing concentrates on the test oracle problem, i.e., the difficulty of determining the expected outcomes of selected test cases or to determine whether the actual outputs agree with the expected outcomes. In general, metamorphic testing is configured to, instead of checking the end result, perform the checking on some invariants that should hold across multiple executions of tests, for example that min(2,3)=min(3,2). However, metamorphic testing only focuses on whether a specific test being run has failed or not and does not use the state of the SUT.

A system, computer program product, and method are disclosed and described herein for conducting model-based, biased, random test generation for SUT testing through REST APIs, where the state of the SUT is continuously monitored and updated through the testing activities. The system, computer program product, and method are configured to combine random, biased, model-based validation test generation with a continuously updated state of the SUT to bias the automatic generation of the validation tests towards valid requests. Moreover, semantic checking based on the discovered state of the SUT further enhances the SUT testing.

In at least some embodiments, the system is a validation testing system that is configured as either, or both, a system and a computer program product configured to execute one or more computer-implemented methods of validation tests for a SUT. The system includes one or more validation testing models. At least one of the embodiments of the validation testing model used herein represents the range of API calls, or requests, that are expected to be transmitted to the respective REST APIs embedded in the SUT. More specifically, the model includes descriptions of the syntax for the API requests and the respective API responses, as well as the dependencies between different resources presented in the SUT. Moreover, the model contains both syntactic and semantic descriptions of the respective API requests embodied as schemas specifying valid syntax for API requests and API responses as well as the dependencies between the different resources presented in the SUT. In at least some embodiments, the model is configured to bias the generation of the API requests towards successful transactions. Accordingly, the system includes a model to facilitate enhancement of the validation testing as described herein.

In one or more embodiments, the state of the SUT is constantly recorded and used to enhance the validation testing of the SUT. The state of the SUT is represented through the resources that exist in the SUT as perceived by observing the API responses that have been received. To establish the known state of the SUT, the system is configured to record the descriptions of newly created and deleted resources as well as resources which already exist, including those resources that were modified. The known state facilitates improving the predictability of the validation tests that in turn improves the checking features (described further herein). Accordingly, the state of the SUT is constantly recorded as it evolves throughout the validation testing.

In at least some embodiments, the system also includes one or more validation test generators that are configured to automatically generate validation tests. Such API request generation creates substantially syntactically and semantically valid API requests through biasing the generated API requests through biasing mechanisms that include, without limitation, random selection of one or more tester inputs, selection of API request syntaxes and resource dependencies from the model, selection of the present state of the SUT, random intentional selection of errors, and randomly biasing the properties of the API requests.

The generator transmits the API requests to the SUT, where at least some of the API requests include one or more of the previously mentioned biasing mechanisms, where some of the biases are selected randomly to enhance the robustness of the testing. The information contained in the state is used to bias the random generator towards semantically valid requests, as well as to predict the API responses.

In some embodiments, the system includes a checker that is configured to validate the API response transmitted from the SUT in response to the API request. In addition, the checker is configured to predict the API response to the present API request through the present state. The actual API response status code is compared to the predicted (or expected) status code and the response content is compared to the predicted content. Therefore, the checker is further configured to validate the syntactic and semantic correctness of the API response from the SUT. In addition, if the response is syntactically correct, the checker is configured to add, update, and remove resources within the recorded state of the SUT (or, at least the portions thereof under test) through the test execution, such that the recorded state of the SUT is consistently in flux. The syntactic correctness, or lack thereof, of the API responses is automatically inferred from the model through a comparison by the checker and syntactically incorrect API responses may include an illegal status code and a syntactically illegal response body. Moreover, for the semantic checking, the checker uses the model and the state to predict an expected status code as well as API response content, which are both compared to the actual API response.

Referring to FIG. 1, a block schematic diagram is provided illustrating a computer system, i.e., a validation testing system 100 (herein referred to as "the system 100") that is configured for testing of a system under test (SUT) through representational state transfer (REST) application programming interfaces (APIs), in accordance with at least one illustrative embodiment. The system 100 includes one or more processing devices 104 (only one shown) communicatively and operably coupled to one or more memory devices 106 (only one shown). The system 100 also includes a data storage system 108 that is communicatively coupled to the processing device 104 and memory device 106 through a communications bus 102. The system 100 further includes one or more input devices 110 and one or more output devices 112 communicatively coupled to the communications bus 102. In addition, the system 100 includes one or more Internet connections 114 (only one shown) communicatively coupled to the cloud 116 through the communications bus 102, and one or more network connections 118 (only one shown) communicatively coupled to one or more other computing devices 120 through the communications bus 102. In some embodiments, the Internet connections 114 facilitate communication between the system 100 and one or more cloud-based centralized systems and/or services (not shown in FIG. 1).

In at least some embodiments, the system 100 is a portion of a cloud computing environment (see FIG. 4), e.g., and without limitation, system 100 is a computer system/server that may be used as a portion of a cloud-based systems and communications environment through the cloud 116 and the Internet connections 114. In some embodiments, the system 100 is operatively and communicatively coupled to one or more systems under test (SUTs) 130 (only one shown) through the cloud 116. Many of the embodiments as described further herein are cloud-based; however, the validation systems, computer program products, and methods as presented in the exemplary embodiments herein are configurable for any computing system configurations, including validation testing of strictly internal communications.

In one or more embodiments, a REST API testing tool 140, herein referred to as "the tool 140", is resident within the memory device 106 to facilitate testing of the SUT 130. The tool 140 communicates with the SUT 130 through one or more REST APIs 132 resident within the SUT 130. In one or more embodiments, the tool 140 includes one or more REST API testing models 144 (herein referred to as "the model 144"). In some embodiments, the model 144 includes descriptions of the syntax for the API requests and the respective API responses, as well as the dependencies between different resources presented in the SUT 130. Moreover, the model contains syntactic descriptions of the respective API requests embodied as schemas specifying valid syntax for API requests and API responses as well as the dependencies between the different resources presented in the SUT. In at least some embodiments, the model 144 is configured to bias the generation of the API requests towards successful transactions. Accordingly, the system 100 includes the model 144 to facilitate enhancement of the validation testing as described herein.

In at least some embodiments, the tool 140 also includes a SUT state module 146. The SUT state module 146 is communicatively coupled to the model 144 and is configured to receive modeled resource dependencies of the resources in the SUT 130 from the model 144. The SUT state module 146 is further configured to capture the actual resource state of the SUT 130 through one or more of direct observation of the state of the SUT 130 through the respective communications conduits (not shown) or through the actual API responses that are indicative of any changes made to the affected resources since the REST APIs are the principle mechanism for such resource management. Therefore, the SUT state module 146 is also configured to capture the add/update/remove resources actions and alter the representation of the present state of the SUT 130 within the SUT state module 146 accordingly. The information contained in the actual resource state is used to bias the random generation of the API requests for the validation testing towards semantically valid requests with the actual state of the SUT 130, as well as to predict the API responses. Accordingly, the actual resource state of the SUT 130 is captured through direct measurement thereof and the modeled resource dependencies.

In some embodiments, the tool 140 further includes a test generation module 148, herein referred to as "the generator 148," that includes an error selection module 149. In some embodiments, the error selection module 149 is a separate module external to the generator 148. The generator 148 is communicatively and operably coupled to the SUT state module 146 and the SUT 130. The generator 148 is configured to automatically generate validation tests through one or more tester input biases, API request syntaxes and resource dependencies from the model 144, the present resource state of the SUT 130 through the SUT state module 146, and randomly biased properties of the API request. Such API request generation creates a substantially syntactically and semantically valid API request in which at least a portion of the inputs to the generation of the API request are randomized and are configured to bias the API requests to increase the robust nature of the validation testing. The generator 148 is also configured to automatically generate errors through the error selection module 149 through modifying a valid request into an invalid request to test the response of the SUT 130 to such invalid requests. The generator 148 is also configured to transmit the API request to the REST APIs 132 in the SUT 130 through the cloud 116 and the Internet connections 114.

In one or more embodiments, the tool 140 also includes a test responses validation/checker module 150, herein referred to as "the checker 150," that is communicatively and operably coupled to the SUT 130, and the state module 146. The checker 150 is configured to generate a prediction of the incoming API response transmitted from the SUT 130 through predicting the expected status code as well as the content of the API responses. The predictions directed toward the respective API responses are at least partially based on respective API response syntax, resource relations, and operational semantics transmitted to the checker 150 from the model 144 the resource state transmitted to the checker 150 from the SUT state module 146. The checker 150 is further configured to compare the predicted content of the API response with the actual API response as transmitted from the SUT 130. The checker 150 is also configured to update the state of the SUT 130 as a function of the API response and the validation thereof, and the model 144.

Figure 2:
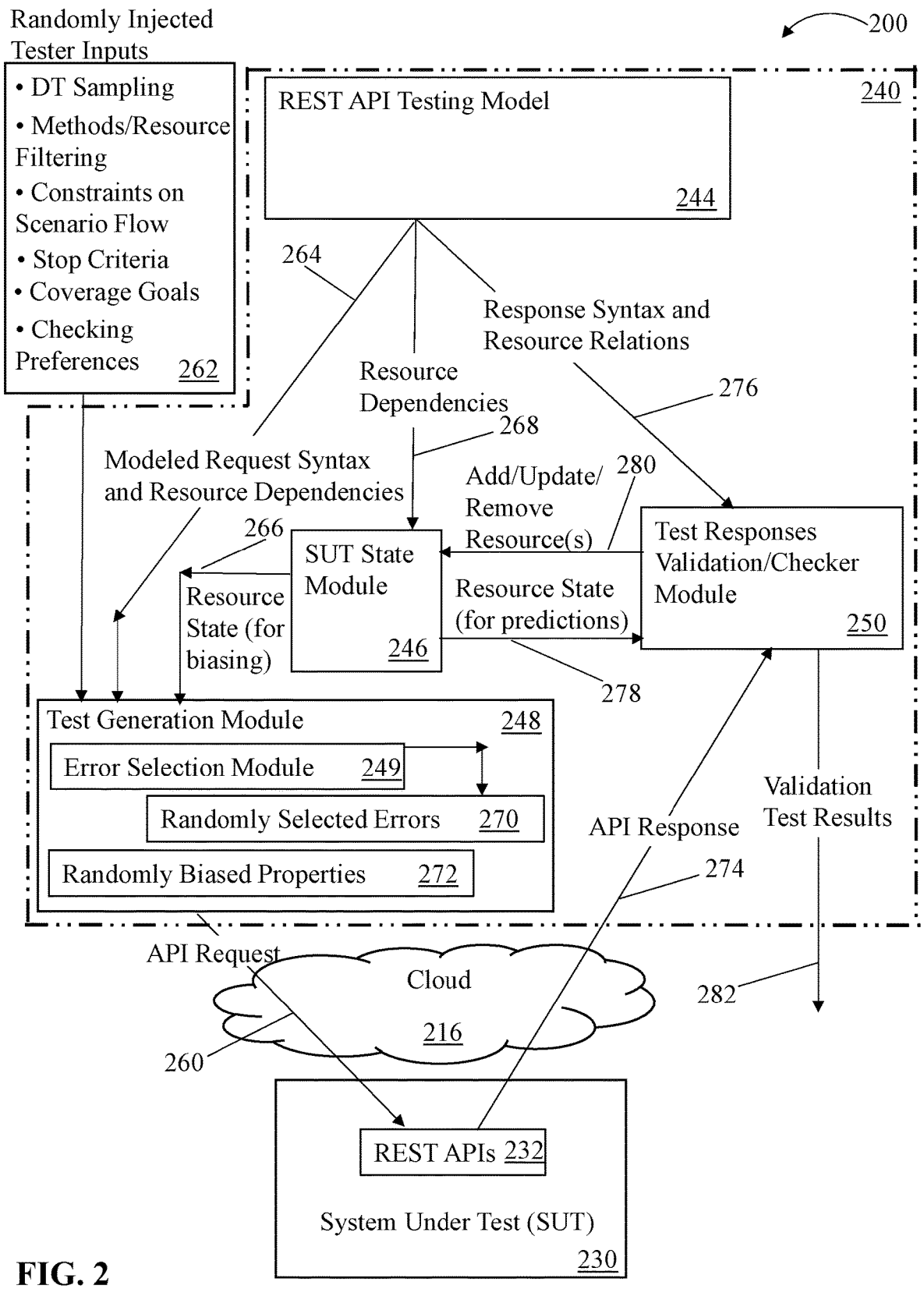
FIG. 2 is a block schematic diagram illustrating the relationships between a REST API testing tool and a SUT, in accordance with some embodiments of the present disclosure.
Figure 3:
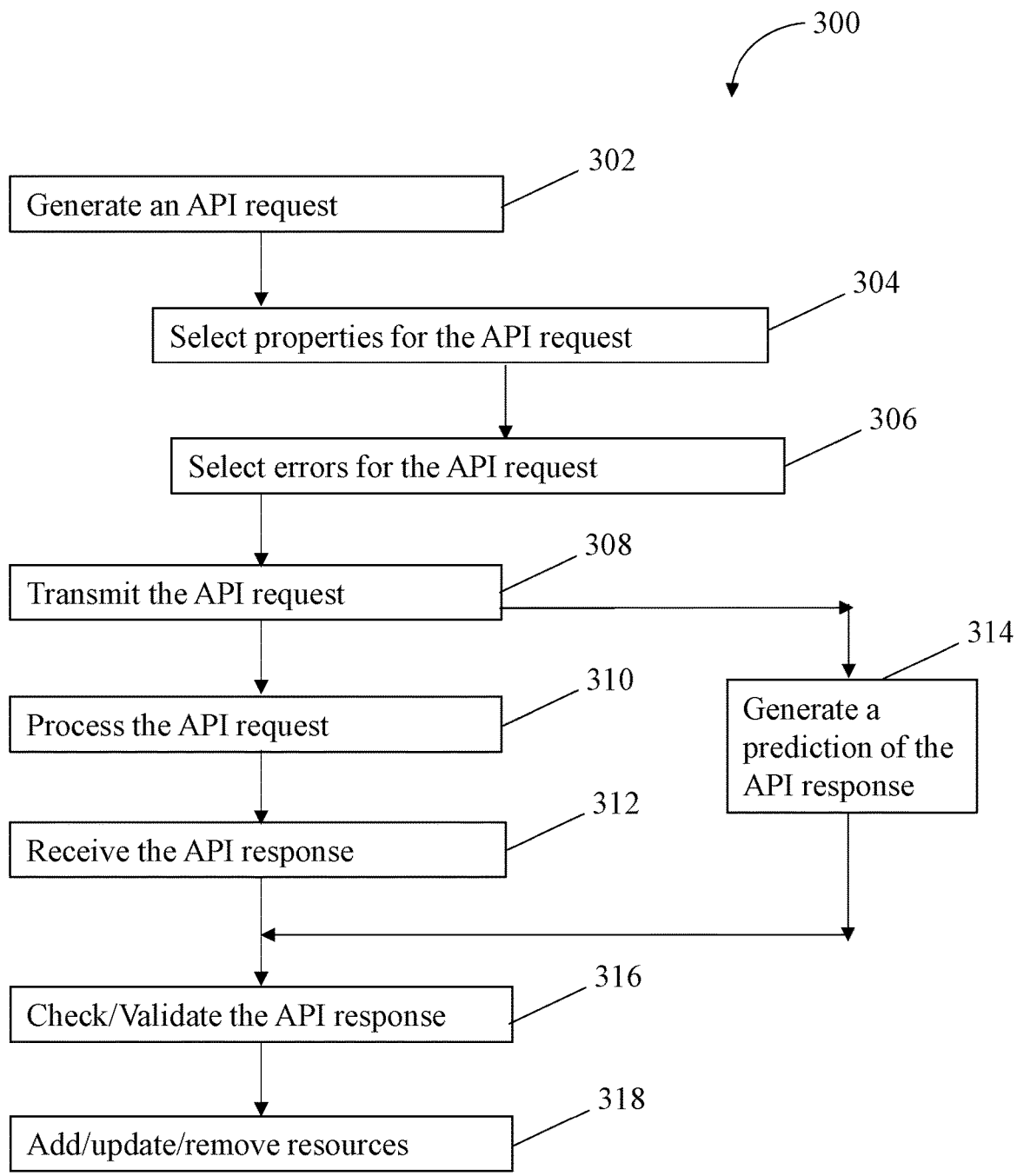
FIG. 3 is a flowchart illustrating a process for validation testing of a SUT with a REST API testing tool, in accordance with some embodiments of the present disclosure.

In at least some embodiments, the data storage system 108 provides storage to, and without limitation, a knowledge base 190 that includes any data that may be used to facilitate operation of the REST API testing tool 140 as described herein, including without limitation, the REST API testing models 144 that are generated prior to the operations described with respect to FIGS. 2 and 3 herein.

Referring to FIG. 2, a block schematic diagram is provided illustrating the relationships 200 between the REST API testing tool 240 and the SUT 230 (both also shown in FIG. 1 as 140 and 130, respectively), in accordance with at least one illustrative embodiment. FIG. 2 includes those components also shown in FIG. 1 with similar numbering. FIG. 3 is a flowchart illustrating a process 300 for validation testing of the SUT 230 with the REST API testing tool 240, in accordance with at least one illustrative embodiment. For purposes of this discussion, FIGS. 2 and 3 are discussed together.

In one or more embodiments, the process 300 includes automatically generating 302 the API request 260 through the generator 248. An API request 260 includes a plurality of fields including, without limitation, an API request path and its method (sometimes the pair is referred to as an operation), various API request properties, and various API request parameters, including the path, query, header, and body parameters. In embodiments, the process 300 includes determining the values for the properties and parameters, which may be difficult. Therefore, the generation step 302 includes automatically, and randomly, selecting 304 one or more randomly biased properties 272 for the API request 260. One of such randomly biased properties 272 includes one or more tester inputs 262 that are automatically and randomly selected for inclusion for the API request 260. The selection of the tester (or user) inputs into the generator 248 increases the robust nature of the biased inputs into the validation testing, with additional biasing discussed further herein. The tester inputs 262 include, without limitation, data type sampling, methods and resource filtering, constraints on the test scenario flows, stop criteria, coverage goals, and checking preferences. In some embodiments, the tester inputs 262 reside within one of the knowledge base 190, an external input device 110, the cloud 116, and another computing device 120, where they may be accessed through by the tool 140 through one or more communications conduits, such as, and without limitation, the communications bus 102, the Internet connection 114, and the network connection 118 (see FIG. 1). In some embodiments, the tester inputs 262 reside in the memory device 106.

In at least some embodiments, the tool 240 includes the one or more models 244. At least one of the models 244 represents the range of REST API calls, or requests 260, that are expected to be transmitted as requests 260 to the respective REST APIs 232 embedded in the SUT 230. More specifically, the model 244 includes descriptions of the syntax for the API requests 260 and the respective API responses 274, as well as the dependencies between different resources presented in the SUT 230. Moreover, the model 244 contains both syntactic and semantic descriptions of the respective API requests 260 embodied as schemas specifying valid syntax for API requests 260 and API responses 274 as well as the dependencies between the different resources presented in the SUT. In at least some embodiments, the model 244 is configured to bias the generation of the API requests 260 towards successful transactions. Accordingly, the model 244 facilitates enhancement of the validation testing as described herein.

In some embodiments, the generator 248 is communicatively coupled to REST API testing model 244. As described above, one or more randomly biased properties 272 are selected 304 for the API request 260. Another of such randomly biased properties 272 is the modeled syntax and resource dependencies 264 that are automatically selected from the model 244 by the generator 248 for inclusion in the API request 260. In addition, the SUT state module 246 is communicatively coupled to the generator 248. Yet another randomly biased property 272 is the recorded resource state 266 of the SUT 230 that is automatically selected from the SUT state module 246 by the generator 248. In some embodiments, the recorded resource state 266 is generated through direct observation of the state of the SUT 230 by the SUT state module 246, where the respective communication channels between the SUT 230 and the SUT state module 246 are not shown for clarity of FIG. 2. In some embodiments, the state of the SUT 230 is established and maintained through the actual API responses 274 that are indicative of any changes made to the affected resources since the REST APIs 232 are the principle mechanism for such resource management. In addition, the SUT state module 246 is updated as a result of the validation testing process 300 (as discussed further herein). Furthermore, in some embodiments, the SUT state module 246 is communicatively coupled to the model 244, where, without limitation, modeled resource dependencies 268 are randomly selected by the SUT state module 246. Accordingly, the recorded resource state 266 is representative of the state of the SUT 230 through direct measurement thereof and the modeled resource dependencies 268. In addition, the information contained in the recorded resource state 266 is used to further bias the random generation of the API requests 260 towards semantically valid requests with the actual state of the SUT 230, as well as to predict the API responses 274 (discussed further herein).

In at least some embodiments, and as preciously described, the generator 248 randomizes the properties 272 of the API request 260. In addition to the previously described properties 272, additional randomly biased properties 272 of the API request 260 include, without limitation, the API request path and its method, the API request parameters, including the path, query, header, and body parameters, and the number of selected errors (as previously described) and their location. Such randomization of the properties of the API request 260 further facilitates biasing the API request 260.

Moreover, in one or more embodiments, in addition to the previously described automatic, randomly-selected, biased properties 272, errors 270 are automatically and randomly selected 306 by the error selection module 249 for the API request 260. Such selected errors 270 facilitate generating "almost syntactically correct" API requests where such errors 270 include, without limitation, typographic errors to mimic user errors. In addition, errors 270 may include semantic errors where the error selection module 249 in the generator 248 intentionally breaks dependency rules, such as referencing deleted or otherwise non-existing resources in the SUT 230. Additional examples of error selection 306 include, without limitation, an extra field in an API request, missing a required field in an API request, the inclusion of a value in an API request that does not reside within any of the respective valid domains, and an incorrect field name in the API request. Accordingly, the error selection module 249 alters valid requests to stress aberrant behaviors and validate the SUT 230 through simulation of wrong or malicious input.

Accordingly, the process 300 uses one or more generators 248 that are configured to automatically generate validation tests through one or more tester inputs 262, API request syntaxes and resource dependencies 264 from the model 244, the recorded present resource state 266 of the SUT 230, errors generated through an embedded error selection module 249, and additional randomly biased properties 272 of the API request 260. Such API request generation 302 creates a substantially syntactically and semantically valid API request 260 (possibly with randomly selected errors) in which the values of different properties of the API request 260 are randomized within their domains based on the information contained in the model 244 and the state 266.

In some embodiments, the API request 260 is transmitted 308 from the generator 248 to the SUT 230 through the cloud 216 and the REST APIs 232. As previously described, at least some of the properties of the API requests 260 have been biased through one or more of errors 270 and the biased properties 272 selected randomly to enhance the robustness of the testing through random manipulation of the API requests 260. The API request 260 is processed 310 by the SUT 230 after initial processing upon receipt by the REST APIs 232 and an API response 274 is generated by the SUT 230, and transmitted to, and received by 312 the checker 250.

In at least some embodiments, the checker 250 is configured to generate 314 a prediction of the incoming API response 274 transmitted from the SUT 230 for the API response 274 through predicting the expected status code as well as the content of the API responses 274. In at least some embodiments, the checker 250 is operably and communicatively coupled to the REST API testing model 244 and the respective API response syntax and resource relations 276 are transmitted to the checker 250. In addition, the SUT state module 246 is operably and communicatively coupled to the checker 250 such that the recorded resource state 278 is transmitted to the checker 250. The recorded resource state 278 is substantially equivalent to the recorded resource state 266. The checker 250 is configured to integrate the respective API response syntax and resource relations 276 and the recorded resource state 278 into a prediction of the present API response 274, where the predicted (or expected) status code (e.g., successful or error API response) and the predicted content of the API response 274 will be compared to the actual API response 274 (discussed further herein). Accordingly, the API response syntax and resource relations 276 and the recorded resource state 278 are used by the checker 250 to generate 320 predictions of at least a portion of the API response 274.

Upon receipt of the API response 274 at the checker 250, the syntax, content, and returned status code of the API response 274 are checked 316, i.e., validated against the predictions generated 314 by the checker 250. In some embodiments, a syntactic check of the API response 274 is conducted and in some embodiments both a syntactic check and a semantic check of the API response are conducted. For the former embodiment, where the generated API response 274 is syntactically correct, the description of the relevant resource(s) are added to the state, deleted from the state, or modified (updated) 318 in the state, as appropriate, thereby altering the recorded state of the SUT 230. In the latter embodiment, for those circumstances where the generated API response 274 is syntactically and semantically correct, the description of the relevant resource(s) are added to the state, deleted from the state, or modified (updated) 318 in the state, as appropriate, thereby altering the recorded state of the SUT 230. The SUT state module 246 captures the actions of the add/update/remove resources actions 280 and the recorded resource state inputs 266 and 278 are altered accordingly. Regardless of using either the syntactic only or the syntactic and semantic checking, only those valid API response 274 will be permitted to alter the state of the SUT 230. An illustrative example includes selecting the recorded state information 266 and 278 of the SUT 230 for a first API request 260. The actual state information of the SUT 230 is captured through checking a first API response 274. The recorded state information 266 and 278 of the SUT 230 is altered, subject to the captured actual state information from the first API response 274. The altered recorded state information 266 and 278 of the SUT 230 is selected for a second API request 260, thereby altering the biasing of the second API request 260 from the biasing of the first API request 260.

In addition, the methods disclosed herein perform syntactic and semantic validation of the API responses 274. The syntactic correctness, or lack thereof, of the API responses 274 is automatically inferred from the model 244 through a comparison by the checker 250 and syntactically incorrect API responses 274 may include one or more of an illegal status code and a syntactically illegal response body. The results of each API response check 316, i.e., the validation test results 282 are transmitted to any location, including, without limitation, one or more of the memory device 106, the data storage system 108, and the output devices 112 (see FIG. 1).

In one or more embodiments, the state of the SUT 230 is constantly recorded and used to enhance the validation testing 300 of the SUT 230. The state of the SUT 230 is represented through the resources that exist in the SUT 230 as perceived by observing the API requests 260 and the API responses 274 that have been received. To establish the known state of the SUT 230, the system 100 is configured to record the descriptions of newly created and deleted resources as well as modifications to resources which already exist. The known state facilitates improving the predictability of the validation tests that in turn improves the checking features (described further herein). In addition, the known state of the SUT 230 is used in the biasing actions as previously described to automatically generate API requests 260 with biased properties. Accordingly, the state of the SUT 230 is constantly recorded as it evolves throughout the validation testing process 300.

In at least some embodiments, the validation testing includes a set of iterative executions of the process 300 with a multitude of shifting biases, or without any selected biases, until the validation testing is completed or the tester has identified any other termination condition.

In some embodiments, the tool 240 is scalable such that there may be multiple generators 248 running in parallel. Since the execution order of the API requests 260 is indeterministic by nature, in some instances, it is possible that the exact state of the SUT 230 may not be precisely determined for a particular time slot (due to the inherent lack of determinism), regardless that only one state can exist at any one point in time. For example, a race between a delete request of a certain first resource, and a post request for a second resource which references the first resource, may result in the checking prediction mechanism considering all the possible outcomes of such a scenario. Accordingly, when possible, more than one possible outcome is considered in the event of parallel requests.

The system, computer program product, and method as disclosed and described herein are configured for conducting model-based, biased, random test generation on a SUT through REST APIs, where the state of the SUT is continuously monitored and updated through the testing activities. More specifically, the system, computer program product, and method as disclosed and described herein are configured to combine random, biased, model-based validation test generation with a continuously updated state of the SUT to bias the automatic generation of the validation tests towards more challenging and robust tests. In addition, the validation testing of the SUT is enhanced through the introduction of constantly modified resources and modified relationships between such resources. Moreover, semantic checking based on the discovered state of the SUT further enhances the validation testing.

In at least some embodiments, a model is configured to bias the generation of the API requests towards successful transactions to facilitate enhancement of the validation testing as described herein to facilitate creating substantially syntactically and semantically valid API requests through biasing the properties of the generated API requests through biasing mechanisms that include, without limitation, one or more tester inputs, API request syntaxes and resource dependencies from the model, the present state of the SUT, random intentional selection of errors, and randomly biasing other properties of the API requests. Some of the biases are selected randomly to enhance the robustness of the validation testing. The random and intentional selection of errors for the API requests alters valid requests to stress certain behaviors and validate the SUT through simulation of wrong or malicious input. Accordingly, such API request generation creates a substantially syntactically and semantically valid API request (possibly with randomly selected errors) in which the values of different properties of the API request are randomized and biased within their domains based on the information contained in the model and the state.

In addition, in one or more embodiments, the state of the SUT is constantly recorded and used to enhance the validation testing of the SUT to leverage the known state to facilitate improving the predictability of the validation tests that in turn improves the checking features utilizing comparisons between predicted features of the API responses and the actual API responses. The information contained in the state is used to bias the random generator towards semantically valid requests, as well as to predict the API responses.

Therefore, the embodiments disclosed herein provide an improvement to computer technology. For example, the robust validation testing mechanisms described herein improve testing internal and cloud-based systems and applications over known testing mechanisms. The implemented validation testing leverages a model of the REST APIs associated with the SUT and the known state of the SUT to complement a suite of API request generation with automatically-inserted and random biases to facilitate validation test generation that is more comprehensive as compared to known SUT validation testing. The implemented validation test generation and test execution operations as described herein include features to more comprehensively test the SUT through the REST APIs with model-based API requests that are configured based on the known state of the SUT and a combination of randomly introduced biases. Accordingly, the improvement to computer technology is manifested in a practical technical application of the methods described herein to execute testing of SUTs through REST APIs through enhancing the generation of the tests and the execution thereof on the respective SUTs.

Figure 4:
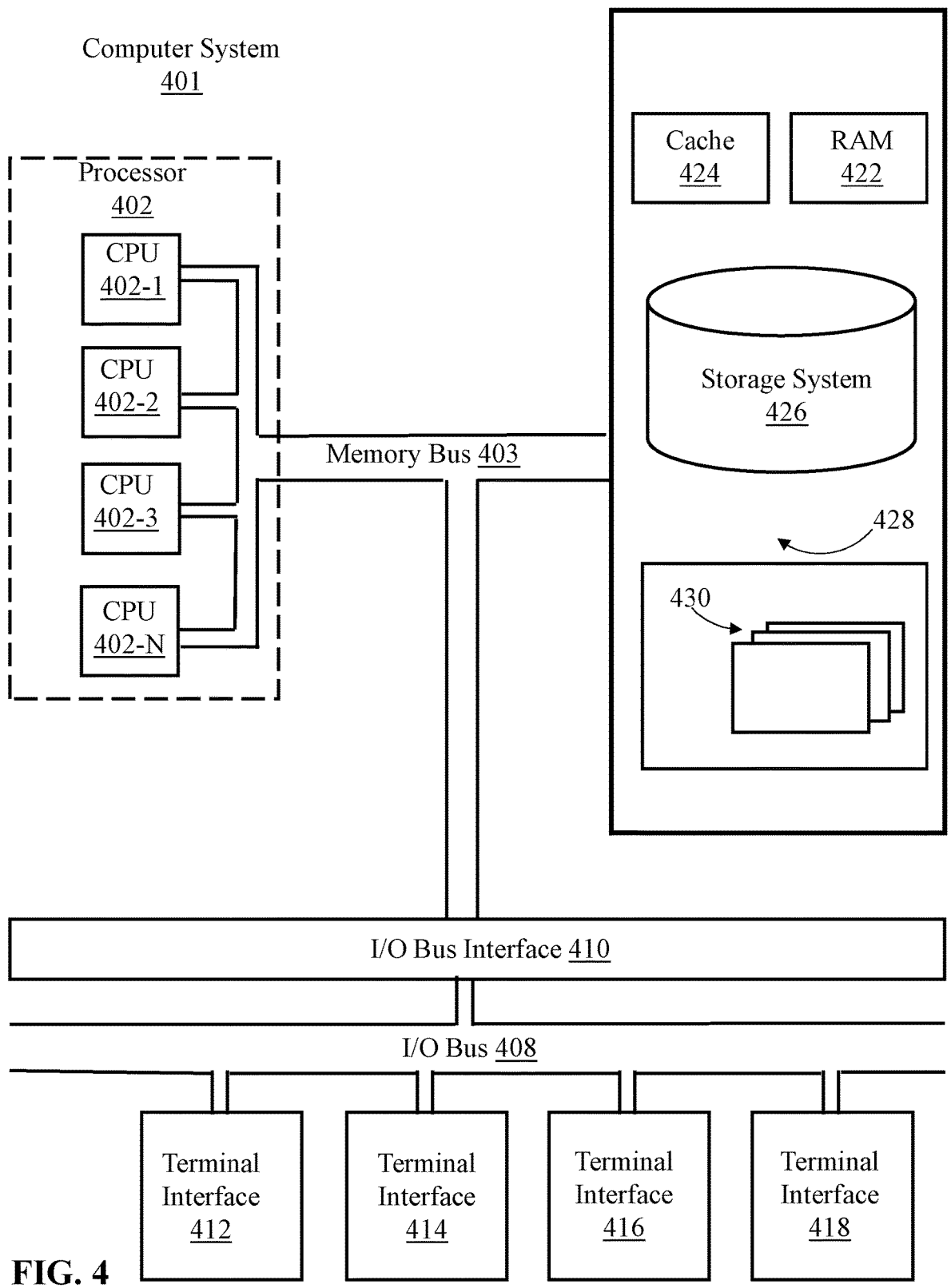
FIG. 4 is a block schematic diagram illustrating a computing system, in accordance with some embodiments of the present disclosure.

Referring now to FIG. 4, a block schematic diagram is provided illustrating a computing system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402-1, 402-2, 402-3, 402-N, herein collectively referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

A cloud computing environment is service oriented with a focus on statelessness, low coupling, modularity, and semantic interoperability. At the heart of cloud computing is an infrastructure that includes a network of interconnected nodes. The system 401 may be employed in a cloud computing environment.

Figure 5:
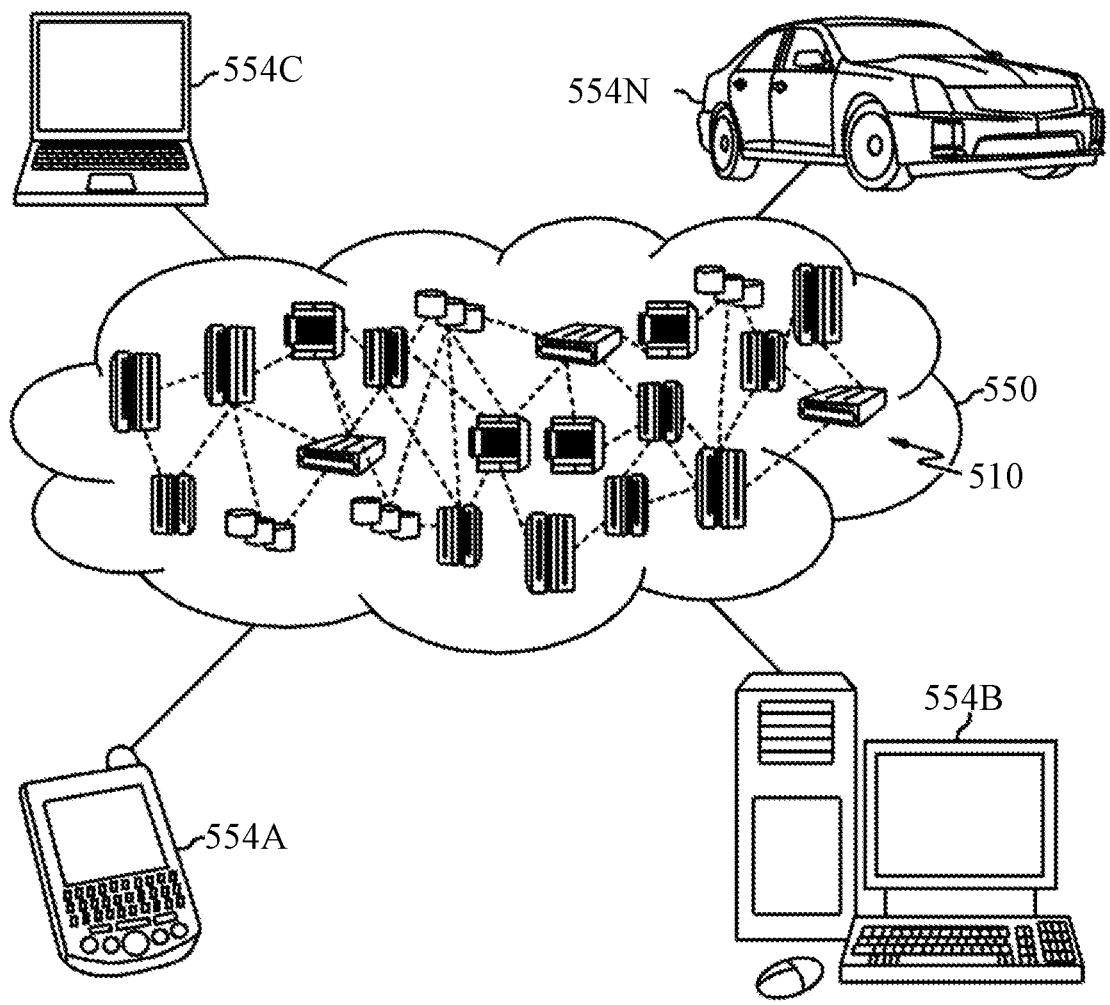
FIG. 5 is a schematic diagram illustrating a cloud computing environment, in accordance with some embodiments of the present disclosure.

Referring to FIG. 5, a schematic diagram is provided illustrating a cloud computing environment 550, in accordance with some embodiments of the present disclosure. As shown, cloud computing environment 550 comprises one or more cloud computing nodes 510 with which local computing devices used by cloud consumers, such as, for example, personal digital assistant (PDA) or cellular telephone 554A, desktop computer 554B, laptop computer 554C, and/or automobile computer system 554N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554A-N shown in FIG. 5 are intended to be illustrative only and that computing nodes 510 and cloud computing environment 550 may communicate with any type of computerized device over any type of network and/or network addressable connection (e.g., using a web browser).

Figure 6:
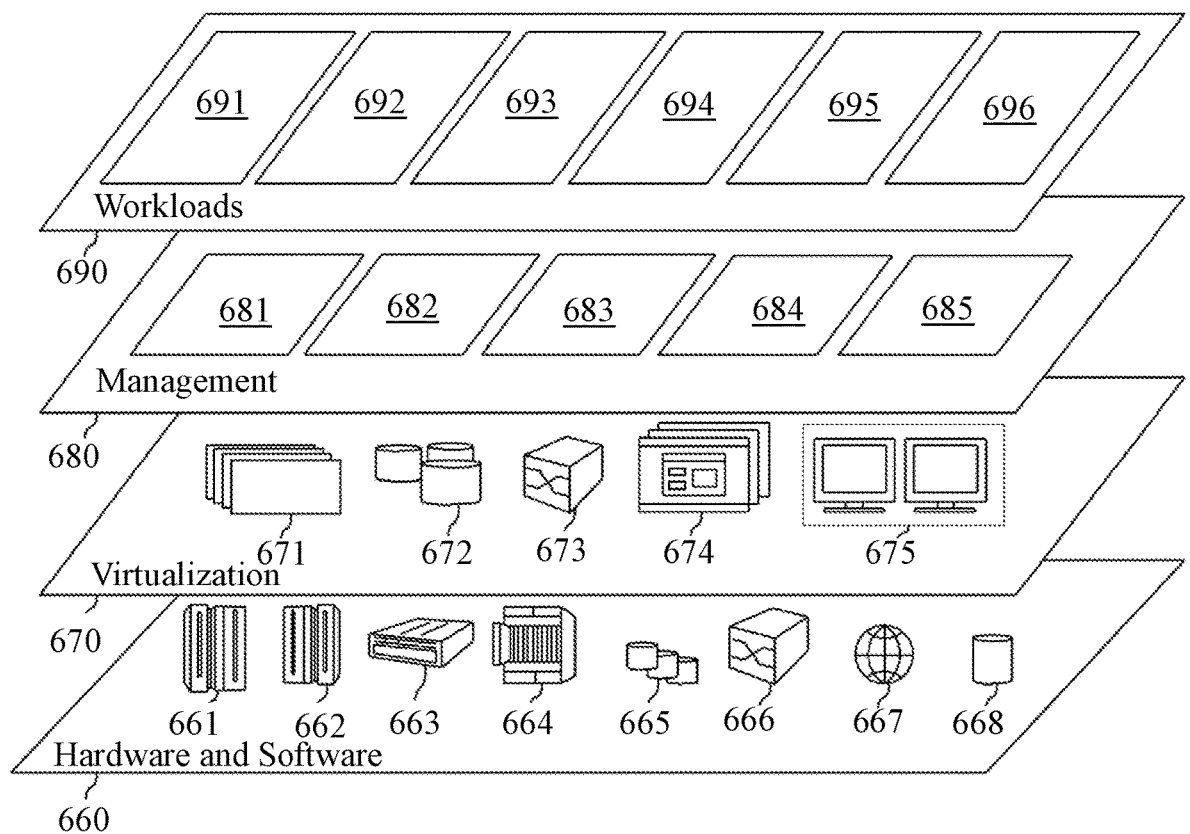
FIG. 6 is a schematic diagram illustrating a set of functional abstraction model layers provided by the cloud computing environment, in accordance with some embodiments of the present disclosure.

Referring to FIG. 6, a schematic diagram is provided illustrating a set of functional abstraction model layers provided by the cloud computing environment 550 (FIG. 5), in accordance with some embodiments of the present disclosure. It should be understood in advance that the components, layers, and functions shown in FIG. 6 are intended to be illustrative only and embodiments of the disclosure are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; layout detection 693; data analytics processing 694; transaction processing 695; and testing of SUTs through REST APIs 696.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals, radio waves or freely propagating electromagnetic waves, electromagnetic waves propagating through a waveguide or other transmission media (light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system to validate a system under test (SUT) comprising:
   one or more processing devices;
   one or more memory devices communicatively and operably coupled to the one or more processing devices; and
   a test generation module and a test responses validation module communicatively and operably coupled to the one or more processing devices, the one or more processing devices executing operations to cause the computer system to:
   generate, through the test generation module, one or more application programming interface (API) requests comprising:
   select, through the test generation module, one or more random biases for one or more properties of the one or more API requests;
   transmit, through the test generation module, the one or more API requests to the SUT;
   receive, from the SUT, an API response for each of the one or more API requests; and
   validate, through the test responses validation module, each API response.

2. The system of claim 1, further comprising a test state module communicatively and operably coupled to the one or more processing devices, the one or more processing devices further executing operations to cause the computer system to:
   select, through the test state module and the test generation module, state information of the SUT for each API request of the one or more API requests.

3. The system of claim 2, the one or more processing devices further executing operations to cause the computer system to:
   select, through the test state module and the test generation module, recorded state information of the SUT for a first API request of the one or more API requests;
   capture, through the test responses validation module, actual state information of the SUT through checking a first API response;
   alter, through the test responses validation module, the recorded state information of the SUT, subject to the captured actual state information from the first API response; and
   select, through the test state module and the test generation module, the altered recorded state information of the SUT for a second API request of the one or more API requests, thereby altering the biasing of the second API request from the biasing of the first API request.

4. The system of claim 1, further comprising a test state module communicatively and operably the one or more processing devices, the one or more processing devices further executing operations to cause the computer system to:
   determine, through the test responses validation module, an API response is syntactically correct; and
   alter, through the test responses validation module, the recorded state of the SUT in the test state module comprising one or more of:
   adding a description of newly created resource to the recorded state of the SUT;
   modifying a description of an existing resource within the recorded state of the SUT; and
   removing a description of a resource that was deleted from the recorded state of the SUT.

5. The system of claim 1, further comprising an error selection module, the one or more processing devices further executing operations to cause the computer system to:
   select, randomly, through the error selection module, one or more errors for the one or more API requests.

6. The system of claim 1, the one or more processing devices further executing operations to cause the computer system to:
   generate, through the test generation module, a prediction for each API response for the one or more API requests through modeled API request syntax and a recorded state of the SUT.

7. The system of claim 6, the one or more processing devices further executing operations to cause the computer system to:

compare, through the test responses validation module, the prediction for each API response to the respective API response transmitted from the SUT.

8. A computer program product embodied on at least one computer readable storage medium having computer executable instructions for validating a system under test (SUT) that when executed cause one or more computing devices to:
to generate one or more application programming interface (API) requests comprising:
select one or more random biases for one or more properties of the one or more API requests;
transmit the one or more API requests to the SUT;
receive an API response from the SUT for each of the one or more API requests; and
validate each API response.

9. The computer program product of claim 8, further having computer executable instructions to:
select state information of the SUT for each API request of the one or more API requests.

10. The computer program product of claim 9, further having computer executable instructions to:
select recorded state information of the SUT for a first API request of the one or more API requests;
capture actual state information of the SUT through checking a first API response;
alter the recorded state information of the SUT, subject to the captured actual state information from the first API response; and
select the altered recorded state information of the SUT for a second API request of the one or more API requests, thereby altering the biasing of the second API request from the biasing of the first API request.

11. The computer program product of claim 8, further having computer executable instructions:
determine an API response is syntactically correct; and
alter the recorded state of the SUT comprising one or more of:
add a description of newly created resource to the recorded state of the SUT;
modify a description of an existing resource within the recorded state of the SUT; and
remove a description of a resource that was deleted from the recorded state of the SUT.

12. The computer program product of claim 8, further having computer executable instructions:
select, randomly, one or more errors for the one or more API requests.

13. The computer program product of claim 8, further having computer executable instructions:
generate a prediction for each API response for the one or more API requests through modeled API request syntax and a recorded state of the SUT; and
compare the prediction for each API response to the respective API response transmitted from the SUT.

14. A computer-implemented method for validating a system under test (SUT), comprising:
generating one or more application programming interface (API) requests comprising:
selecting one or more random biases for one or more properties of the one or more API requests;
transmitting the one or more API requests to the SUT;
receiving an API response from the SUT for each of the one or more API requests; and
validating each API response.

15. The method of claim 14, wherein the selecting one or more random biases for one or more properties of the API request comprises:
selecting state information of the SUT for each API request of the one or more API requests.

16. The method of claim 15, further comprising:
selecting recorded state information of the SUT for a first API request of the one or more API requests;
capturing actual state information of the SUT through checking a first API response;
altering the recorded state information of the SUT, subject to the captured actual state information from the first API response; and
selecting the altered recorded state information of the SUT for a second API request of the one or more API requests, thereby altering the biasing of the second API request from the biasing of the first API request.

17. The method of claim 14, wherein validating each API response comprises one or more of:
determining an API response is syntactically correct; and
altering the recorded state of the SUT comprising one or more of:
adding a description of newly created resource to the recorded state of the SUT;
modifying a description of an existing resource within the recorded state of the SUT; and
removing a description of a resource that was deleted from the recorded state of the SUT.

18. The method of claim 14, further comprising:
selecting, randomly, one or more errors for the one or more API requests.

19. The method of claim 14, further comprising:
generating a prediction for each API response for the one or more API requests through modeled API request syntax and a recorded state of the SUT.

20. The method of claim 19, further comprising:
comparing the prediction for each API response to the respective API response transmitted from the SUT.

* * * * *